United States Patent Office.

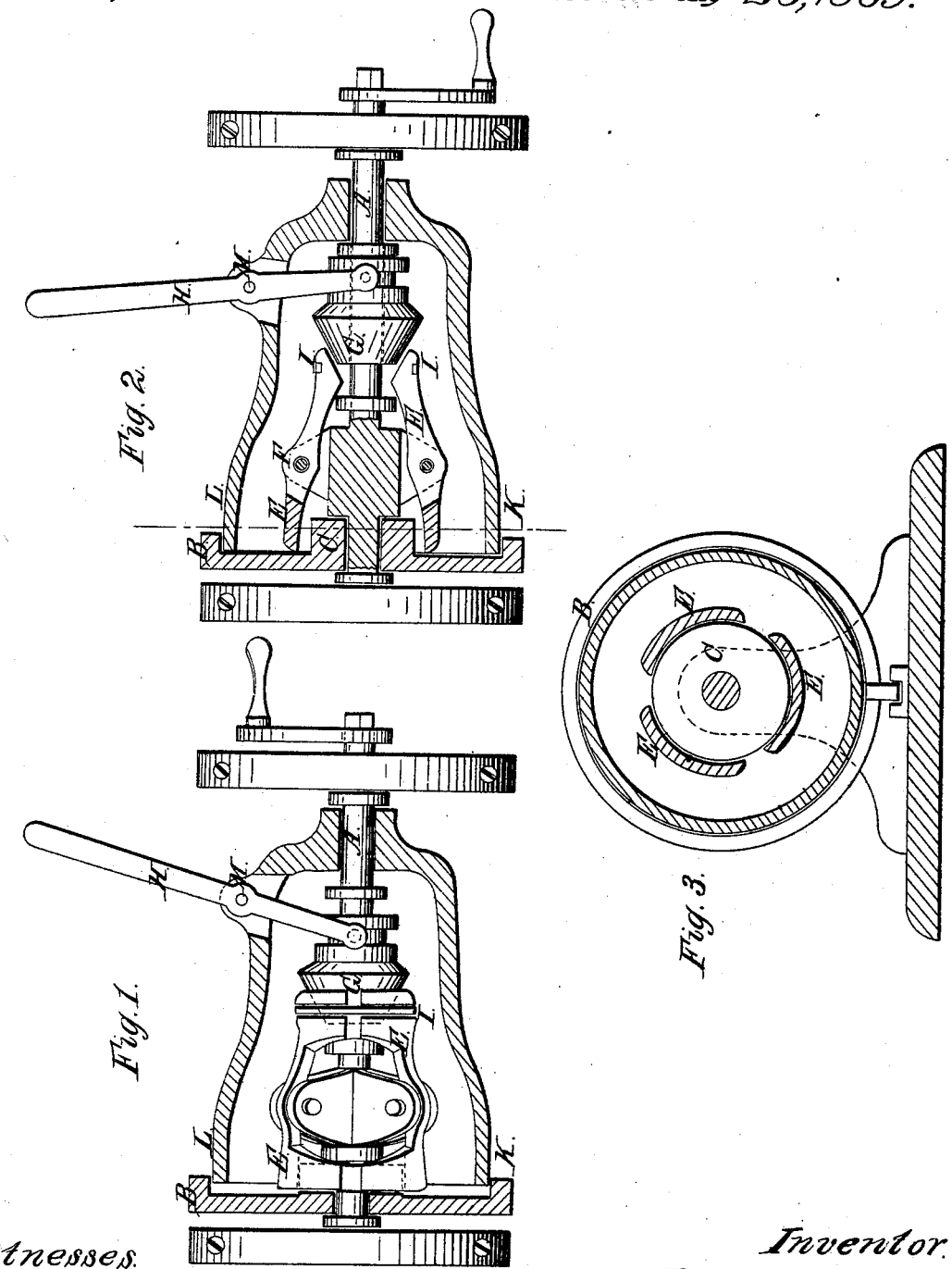

DARIUS BANKS, OF NEW YORK, N. Y.

Letters Patent No. 90,481, dated May 25, 1869.

IMPROVED FRICTION-CLUTCH.

The Schedule referred to in these Letters Patent and making part of the same.

*To all whom it may concern:*

Be it known that I, DARIUS BANKS, of the city, county, and State of New York, have invented a new and improved Friction-Clutch and Brake; and I do hereby declare that the following is a full, clear, and exact description thereof, which will enable others skilled in the art to make and use the same, reference being had to the accompanying drawings, forming part of this specification.

This invention relates to improvements in friction-devices for connecting or disconnecting a driving-pulley, or other wheel fixed loosely on the driving-shaft having constant motion, so as to stop or start the said wheel at will, or to vary the motion thereof.

It relates also to improvements in friction-brake mechanism, so combined with the clutch-devices as to be operated by the same moving-power, and to act in conjunction therewith, as will be hereinafter more fully specified.

Figure 1 represents a longitudinal sectional elevation of my improved clutch and brake, showing the clutch in the working-position.

Figure 2 represents a similar view, showing the brake in the working-position.

Figure 3 represents a transverse sectional elevation.

Similar letters of reference indicate corresponding parts.

A represents the driving-shaft, and B a loose pulley thereon. The latter is provided with a hub, C, whereon the short arms of three or more levers, E, pivoted to supports F, fixed to the said shaft, are caused to act like the jaws of a vise by a sliding conical hub, G, splined to the shaft and provided with a lever, H, for operating it. Said lever is supported on the fulcrum-pin M, and is operated by hand or otherwise, to move the hub between the ends of the long arms of the levers, and cause them to gripe the hub of the wheel with sufficient force to cause the wheel to move in unison with the shaft; or the pressure may be so gauged as to allow the wheel to run slower than the shaft if desired, as is frequently the case in operating sewing and other similar machines.

To cause the levers to open for disengaging the hub, I employ a hoop or band, I, of any suitable substance, encircling the long arms of the levers, for drawing them together when the hub is withdrawn.

It is very necessary in many kinds of light machinery, such as turning-lathes, sewing-machines, &c., to stop them quickly after being thrown out of gear. To accomplish this, I employ, in connection with my improved clutch, a friction-brake, L, and under an arrangement whereby it is brought into action by the act of releasing the clutch. It consists of a hollow sleeve, bearing at one end on the shaft, enclosing the clutch-mechanism, and capable of sliding on the shaft, but not rotating with it. The clutch-lever H passes through the shell thereof, and is supported thereat by a fulcrum-pin, M. The open end may, by a slight endwise movement, be brought into contact with the face of the pulley; and this endwise movement is effected by the movement of the lever for the withdrawal of the hub G, and the opposite movement of the brake is effected when the lever is operated to clutch the pulley.

By a careful adjustment of the lever H, the two devices may be so caused to act on the wheel as to impart thereto the full speed of the shaft, or any slower speed which may be desired, as will be readily understood.

I claim as new, and desire to secure by Letters Patent—

The combination of the loose pulley B, provided with the friction-hub C, the shell L, arranged loosely on the pipes A, the clamping-levers E, pivoted to said shaft, and the conical hub G, sliding thereon and operated by the hand-lever H, all the parts being constructed, arranged, and operating as set forth.

The above specification of my invention signed by me, this 8th day of February, 1869.

DARIUS BANKS.

Witnesses:
 FRANK BLOCKLEY,
 E. GREENE COLLINS.